C. EBERHART, Jr. & S. MAZUR.
REGISTERING MECHANISM FOR LIQUID TANKS.
APPLICATION FILED DEC. 30, 1915.
1,281,313.
Patented Oct. 15, 1918.
6 SHEETS—SHEET 5.
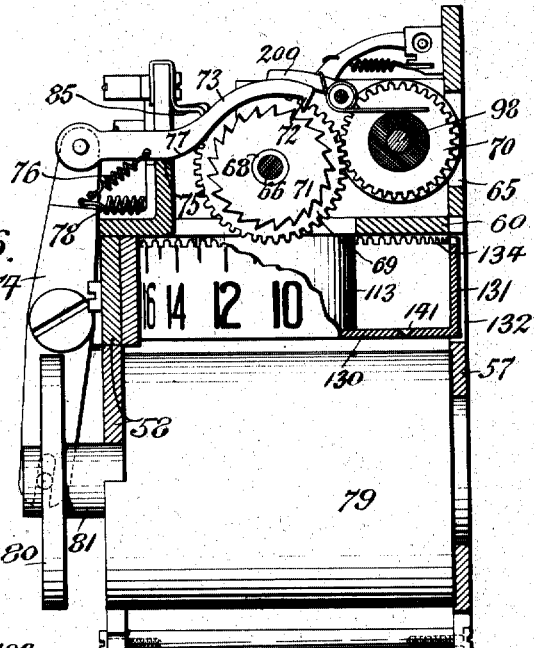
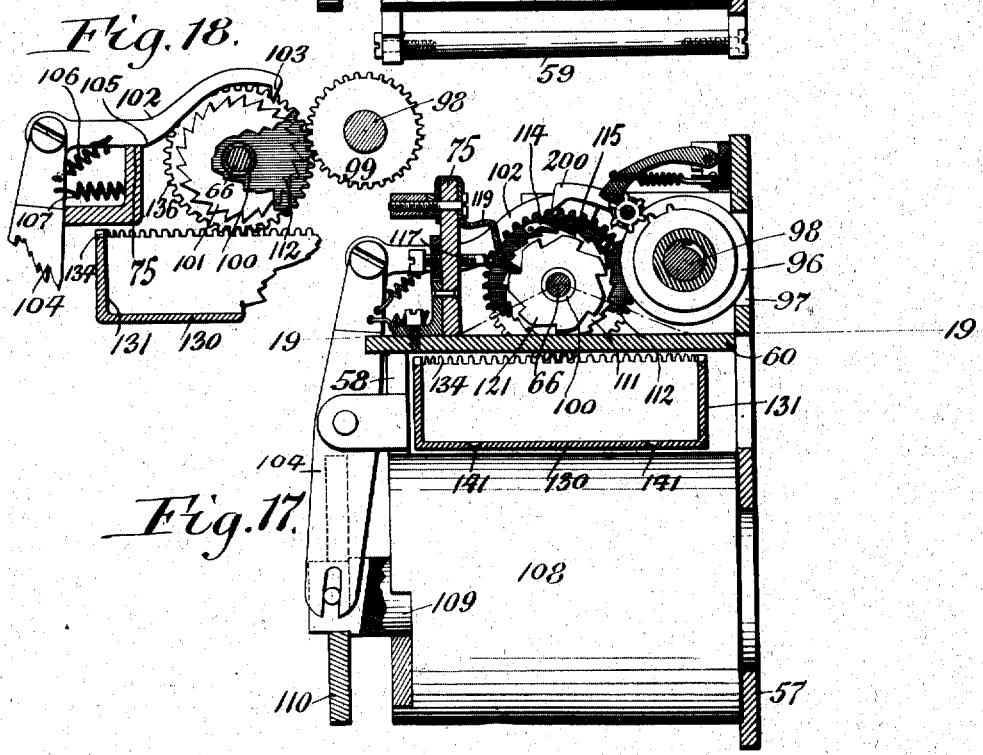
Inventors
Cleburne Eberhart Jr
Samuel Mazur
by Geyer & Pope
Attorneys

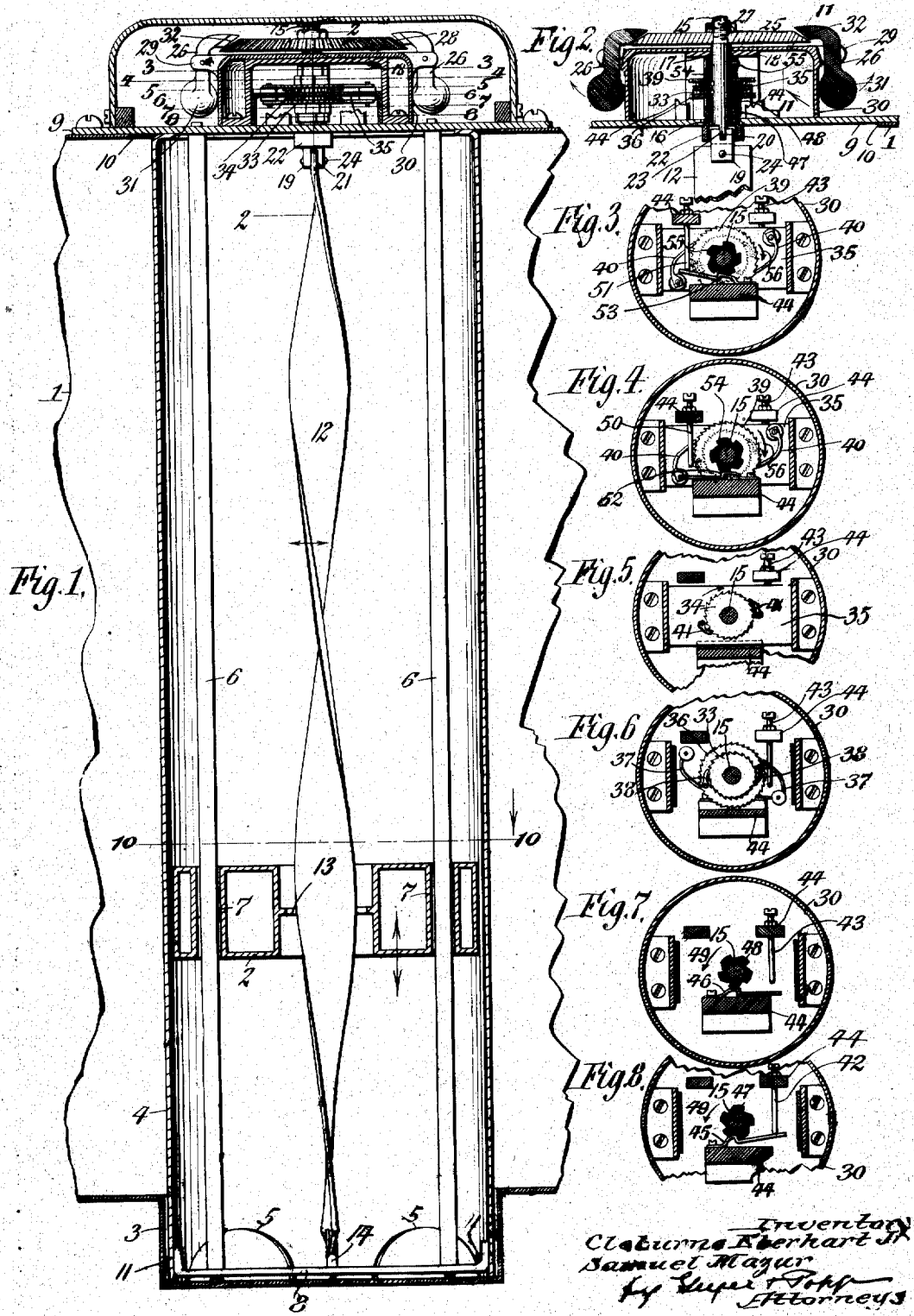

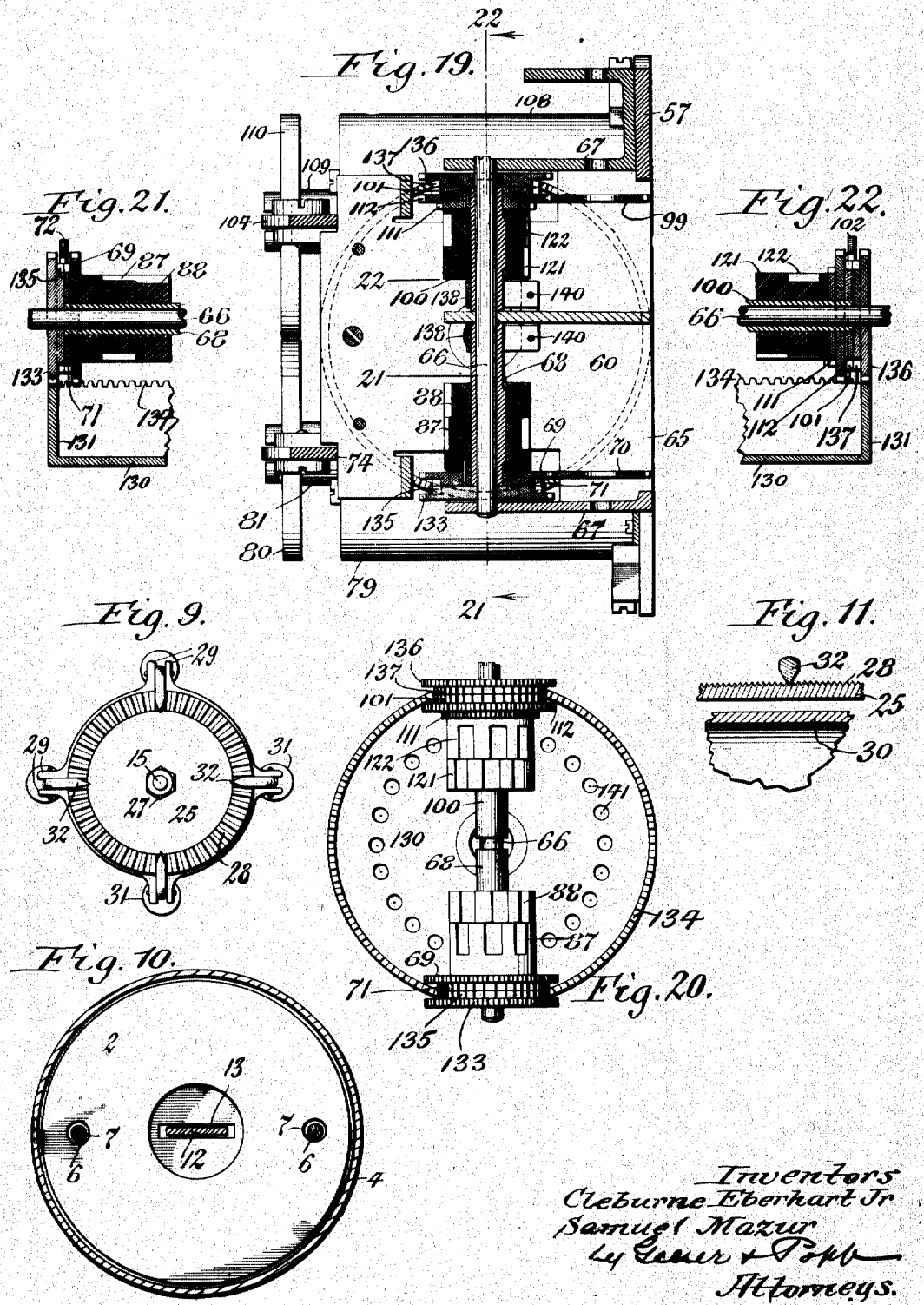

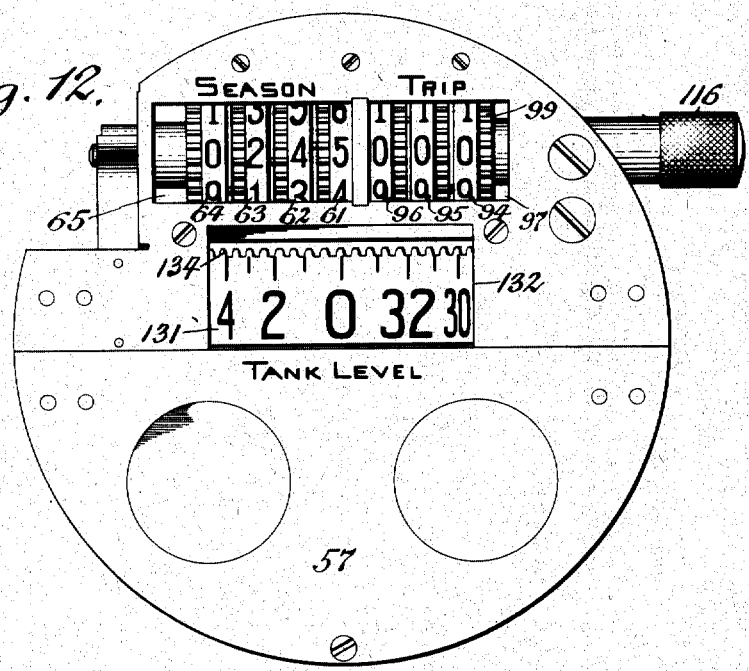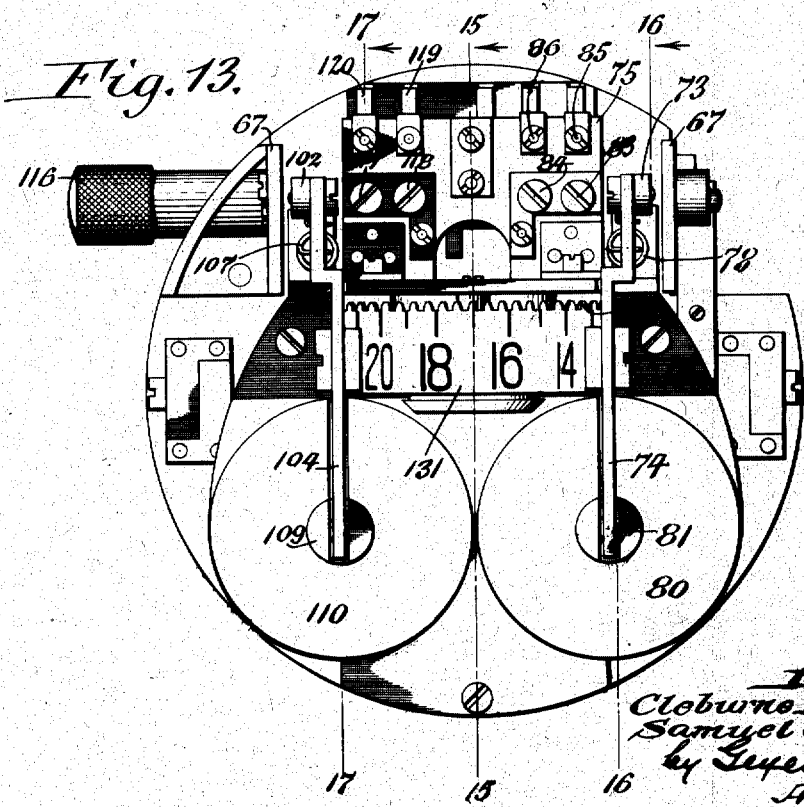

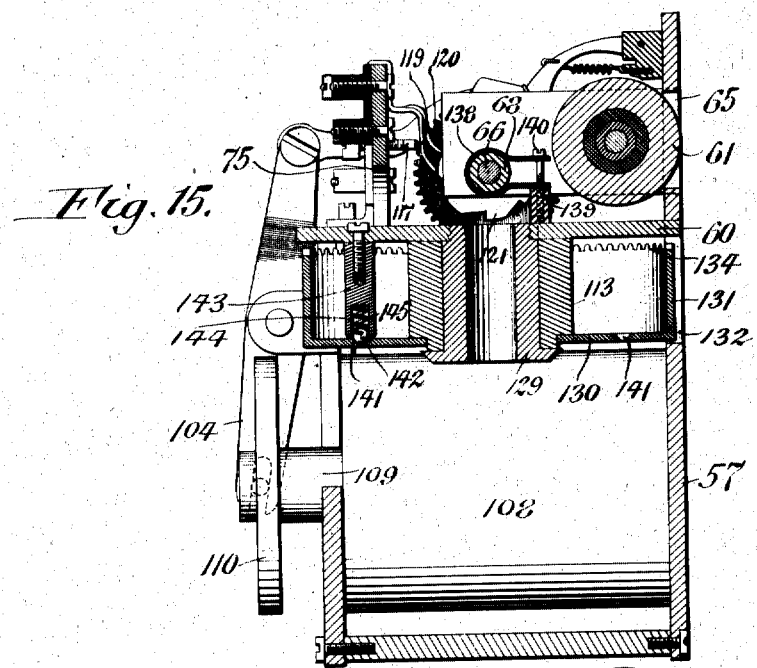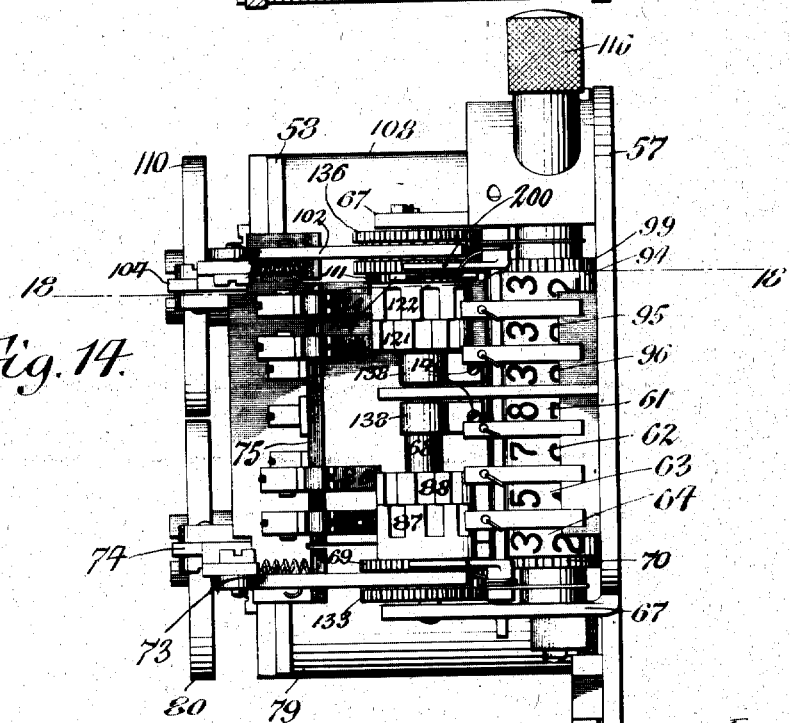

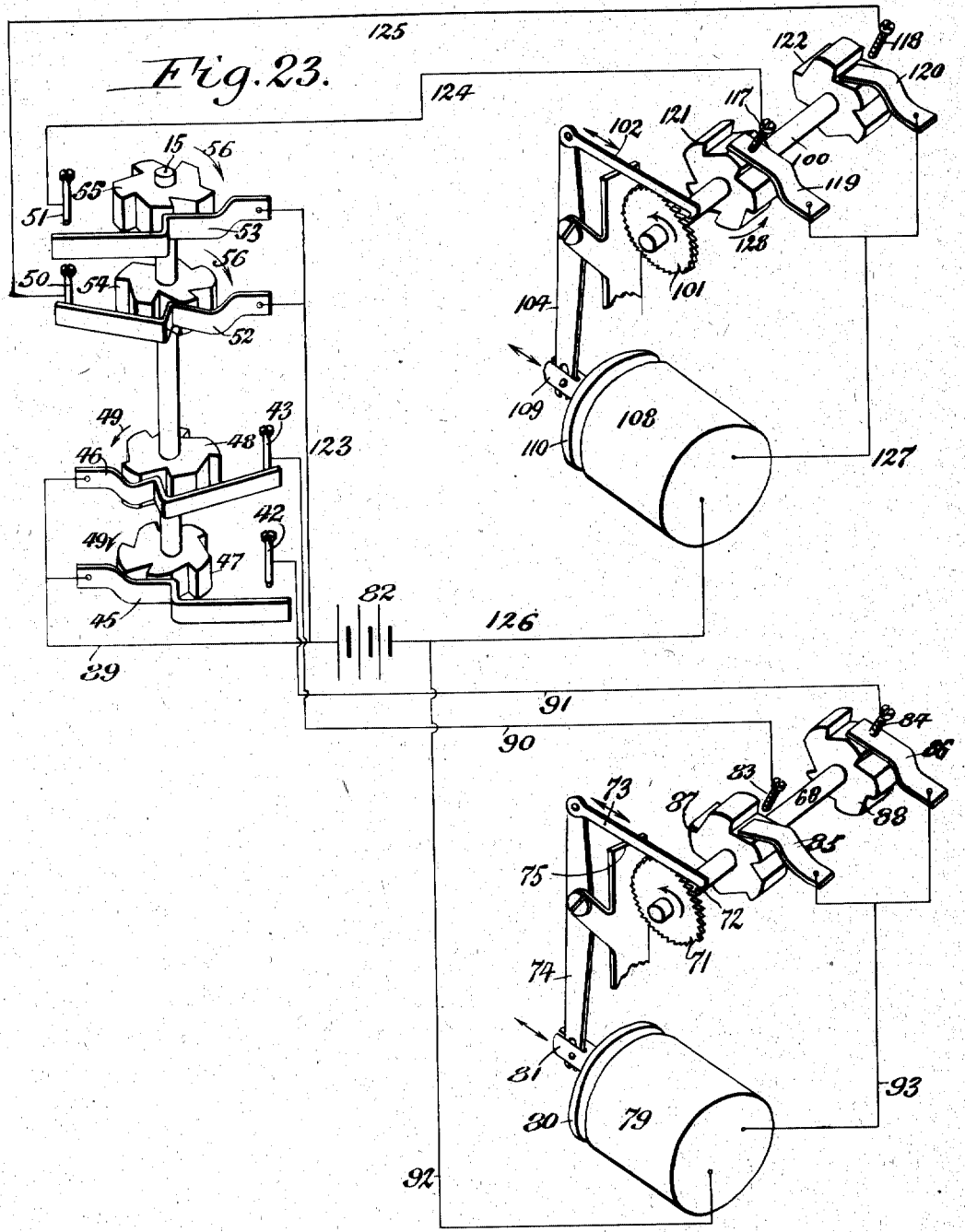

UNITED STATES PATENT OFFICE.

CLEBURNE EBERHART, JR., AND SAMUEL MAZUR, OF BUFFALO, NEW YORK; SAID MAZUR ASSIGNOR TO SAID EBERHART.

REGISTERING MECHANISM FOR LIQUID-TANKS.

1,281,313.  Specification of Letters Patent.  Patented Oct. 15, 1918.

Application filed December 30, 1915.  Serial No. 69,357.

*To all whom it may concern:*

Be it known that we, CLEBURNE EBERHART, Jr., and SAMUEL MAZUR, citizens of the United States, residing at Buffalo, in the county of Erie and State of New York, have invented new and useful Improvements in Registering Mechanism for Liquid-Tanks, of which the following is a specification.

This invention relates generally to a mechanism for registering the total amount of liquid which has been introduced into the tank, also the amount of liquid which has been removed from the tank and also the amount of liquid which is still present at any particular time in the tank. A device of this character is capable of various uses, for instance, in connection with the gasolene tank of an automobile for determining the amount of gasolene which is introduced into the tank throughout a season or predetermined period during which the car is operated, also to indicate the amount of gasolene which may be used on some particular trip, and also to indicate the amount of gasolene which is still on hand at any particular time in the tank. This indicating mechanism enables the operator of an automobile or similar vehicle, such as a motor boat, to calculate the cost of running the vehicle for any particular season, and also enables the driver to inform himself as to the quantity of gasolene required for a particular trip, so that a sufficient supply is taken aboard at the proper time, and also informs the driver as to the amount of gasolene on hand so that he can replenish the same when necessary and thereby avoid running out of gasolene at an inopportune time.

The object of this invention is to provide an indicating mechanism of this character in which improved means are provided for electrically transmitting the movement of the parts which are responsive to variations in the height of gasolene in the tank to the various registering devices which are arranged remote from the tank and adjacent to the place usually occupied by the driver, which electrical transmitting means are so organized that the production of sparks adjacent to the gasolene tank is avoided and ignition of any gasolene vapors which may be present in that locality is therefore rendered impossible. In carrying out the purpose of this invention various improvements in details of construction have been provided as will be hereinafter more fully described.

In the accompanying drawings:

Figure 1 is a fragmentary vertical section of a gasolene tank provided with that portion of our improved indicating mechanism which is mounted on the tank, this section being taken lengthwise of the latter. Fig. 2 is a fragmentary transverse section of the same taken on line 2—2, Fig. 1. Figs. 3, 4, 5, 6, 7 and 8 are horizontal sections taken on the correspondingly numbered lines in Fig. 1 and looking downwardly. Fig. 9 is a top plan view of the retarding device associated with the float operated shaft. Fig. 10 is a horizontal section taken on line 10—10, Fig. 1. Fig. 11 is a fragmentary vertical section taken on line 11—11, Fig. 2 and showing one of the retaining dogs in its operative position. Fig. 12 is a front view, on an enlarged scale, of the registering devices which indicate the total amount of gasolene supplied to the tank from time to time, the amount of gasolene taken from the tank during a particular trip, and also the amount of gasolene still on hand. Fig. 13 is a rear elevation of the same. Fig. 14 is a top plan view of the same. Figs. 15, 16 and 17 are vertical transverse sections taken on the correspondingly numbered lines in Fig. 13. Fig. 18 is a fragmentary vertical longitudinal section taken on line 18—18, Fig. 14. Fig. 19 is a horizontal section taken on line 19—19, Fig. 17. Fig. 20 is a detached top plan view of the tank registering dial wheel and associated parts. Figs. 21 and 22 are fragmentary vertical transverse sections taken on lines 21—21 and 22—22, Fig. 19, respectively. Fig. 23 is a diagrammatic perspective view showing the electric circuits between the float operated mechanism and the operating mechanism of the registering devices.

Similar characters of reference indicate corresponding parts throughout the several views.

Although this registering mechanism is desirable for a variety of purposes the same is shown in the drawings in connection with the tank 1 of an automobile which is adapted to contain the supply of gasolene for operating the engine of the motor car. This tank is usually constructed in the form of a cylinder having its axis arranged horizontally but the shape of this tank is immaterial. Within this tank is arranged a float 2 which may be of any suitable construction so that it will rise and fall with the gasolene in the tank as the level of the latter varies, this movement of the float being utilized to operate the switches of electrical circuits associated with devices which operate the dial mechanisms adjacent to the place or compartment usually occupied by the driver, so that the latter may readily observe the condition of his gasolene supply and the amount which has been consumed. This float may be constructed in any suitable manner but as shown in Figs. 1 and 10 the same is preferably constructed of sheet metal in the form of a hollow body which is sufficiently buoyant that the same will ride on top of the gasolene in the tank and rise and fall with the latter as the level of the gasolene within the tank changes. In order to enable a practically true register to be obtained as to the amount of gasolene in the tank, particularly when the same is empty, or nearly so, the bottom or lower side of the tank is provided with a downwardly projecting pocket 3 which is adapted to receive the float in its lowermost position. The depth of this pocket is substantially equal to the height of the float so that when the tank is completely emptied and the float is in its lowest position within the pocket the bottom or lower side of the tank will be flush with the top of the float, or substantially so, and thus enable the position of the float within the tank to be utilized for obtaining an accurate indication on the dial mechanism associated therewith for properly determining the amount of gasolene which is on hand within the tank.

In order to prevent the waves due to agitation or swashing of the gasolene in the tank from bobbing the float up and down and thus improperly operate the dial mechanism to an undue extent, which otherwise would be liable to occur, a guard 4 is provided which is arranged around the space which is traversed by the float during its rising and falling movement and separates this space from the remaining part of the space within the gasolene tank, so that an undue fluctuation in the level of the main part of the gasolene in the tank will not unduly influence the level of that part of the gasolene upon which the float rests. In its preferred form this guard is constructed in the form of a cylinder which is arranged in an upright position within the tank and extends from the bottom of the pocket 3 to the top of the tank around the vertical path of the float. At its lower end this guard is provided with notches or openings 5 which permit the gasolene to freely enter and leave the space within the guard, so as to maintain a uniform level of the gasolene throughout the tank as the same rises and falls. As the float rises and falls the same is guided so that it is held against turning about a vertical axis for which purpose it is preferable to employ two upright guide rods 6, 6 arranged parallel and on opposite sides of the axis of the float, the latter being provided with guideways or openings 7, 7 near its margin which receive said guide rods and enable the float to slide vertically thereon as the latter rises and falls in response to the variations in the level of the gasolene. These guide rods are secured at their lower ends to a cross bar 8 and at their upper ends to a supporting plate 9 which is removably secured over an opening 10 in the top of the gasolene tank. The guard cylinder is preferably secured at its lower end to the lower cross bar 8 by means of screws 11 and its upper end bears against the underside of the supporting plate 9.

12 represents an upright spiral constructed by twisting a strip of sheet metal or similar material about a vertical axis so that the same is very light. This spiral is pivotally supported at its upper and lower ends and passes with its intermediate part through a slot 13 formed in the central part of the float so that the latter upon rising and falling will cause the spiral to turn horizontally in one direction or the other. In the following explanation it will be assumed that when the float rises and turns the spiral this movement of the latter will be regarded as in the forward direction while the movement due to the descent of the float will be regarded as in the backward direction. As shown in Fig. 1, the means for pivotally supporting the spiral at its lower end comprise a pivot pin 14 projecting downwardly from the lower end of the spiral and journaled in a suitable bearing opening formed in the central part of the lower cross bar 8. The pivotal support for the upper end of the spiral comprises an upright driving or float shaft 15 which has its lower end operatively connected with the upper end of the spiral and which is journaled near its lower end in a lower bearing 16 arranged on the adjacent part of the supporting plate 9 while the upper end of this shaft is journaled in a bearing 17 formed in the central part of a horizontal bar 18 forming part of a frame which is secured to the outer side of the supporting plate 9 in any suitable manner.

In order to obtain a maximum accuracy in the operation of the float mechanism and the dial mechanism associated therewith so as to correctly indicate the amount of gasolene which is introduced into the tank or removed therefrom, it is necessary for the float and spiral to operate upon each other with a minimum of friction and in order to attain this result the upper end of the spiral is connected by means of a universal joint with the lower end of the driving or float shaft 15 so that if the spiral should be deflected slightly out of its true central position the same will not be cramped relatively to this driving shaft but will be free to transmit movement to the latter without producing an undue frictional resistance between the spiral and the driving shaft or between the spiral and the float. In its preferred form, as shown in Figs. 1 and 2, this universal joint comprises a coupling block 19 provided at its upper and lower ends with transverse notches or slots 20, 21 which open upwardly and downwardly respectively and are arranged at right angles to each other. The upper end of this coupling block is arranged within an annular socket 22 on the underside of the lower bearing 16 of the driving shaft and the upper notch of this block receives loosely a flat key 23 arranged diametrically on the lower end of the driving shaft, while the lower notch of this block receives the upper end of the spiral and is pivotally connected therewith by means of a horizontal pivot pin 24 passing through the lower end of the coupling block and the upper end of the spiral and arranged at right angles to the lower notch of this block. By this means the upper end of the spiral may be displaced laterally to a limited extent relatively to the driving shaft 15 and still properly transmit motion from the spiral to this shaft as the float rises and falls without causing the float to bind on the spiral or cramping the connection between the spiral and the driving shaft which otherwise would reduce the sensitiveness of the float mechanism and result in an inaccurate registration of the gasolene supply and delivery and the amount of gasolene on hand.

When this apparatus is installed on an automobile or similar vehicle which is liable to be tilted sidewise or forwardly and backwardly the level of the liquid in the tank is shifted relatively to the top and bottom of the tank without producing any variation in the actual quantity or volume of gasolene contained within the tank. This is particularly liable to occur in the case of an automobile when the same is traveling over a roadway having a high crown or a roadway running over hills and through valleys. When an automobile passes from the crown to the gutter of the street in order to make room for another vehicle, the level of the liquid within the tank changes with reference to the top and bottom of the same and the same effect is produced when an automobile runs up or down a hill or valley, during which time the volume of liquid in the tank is not changed. At such times, however, it is desirable to prevent the float from rising and falling in response to the variations in the level of the liquid in the tank otherwise an inaccurate or false registration of gasolene would be produced on the dial mechanism. For the purpose of preventing rotation of the spiral and the rising and falling movement of the float at such times means are provided which automatically lock the spiral and associated parts against rotary movement when the automobile is traveling over uneven ground and these parts are again unlocked when the car again returns to a level part of the roadway. The preferred means for this purpose comprise a locking wheel 25 secured to the upper end of the driving or float shaft 15 so as to turn therewith and a plurality of locking levers 26 coöperating with this locking wheel. The latter is preferably secured at its center to the upper threaded end of the driving shaft by means of the screw nut 27 and its marginal portion or periphery is beveled and provided with an annular row of teeth 28. The locking levers may vary in number but it is preferable to employ four of them arranged equidistant around the locking wheel, two of these levers being arranged on diametrically opposite sides of this wheel on a line transversely of the automobile and the other two on diametrically opposite sides of the locking wheel and on a line arranged lengthwise of the automobile. These levers may be pivotally supported so as to swing vertically in any suitable manner but, as shown in the drawings, these levers are pivoted on lugs 29 arranged on the upper part of a casing 30 extending over the frame bar 18 and adapted to form a casing or inclosure for the parts which coöperate with the driving or float shaft 15. At its lower arm each locking lever is provided with a weight 31 and on its upper arm with a tooth or jaw 32 which projects inwardly over the toothed rim of the locking wheel. When the automobile is traveling over a level road the pendant weights of the several locking levers hold the latter in a position in which their jaws are held out of engagement from the toothed rim of the locking wheel, as shown in Figs. 1 and 2, at which time the driving shaft 15, is free to be turned by the float acting upon the spiral. When, however, the automobile tilts sidewise in either one direction or the other or when the same is tipped either fore or aft one or the other of the locking levers, as its lower arm, moves outwardly under the action of the weight thereon, causes the upper arm thereof to be moved inwardly, thereby causing the jaw thereof to engage with the adjacent teeth of the locking wheel. The latter and the parts operatively connected therewith are now held against rotation, thereby preventing the float from following the abnormal level of the gasolene which is produced in the tank at this time and avoiding an inaccurate registration of the same on the dial mechanism. As soon as the motor car or vehicle again takes a level road the respective locking lever which has been in service is again moved into its inoperative position and the driving shaft 15 and spiral are released, so that the same can be again actuated by the float.

If any gasolene is added to or subtracted from the tank while the float is locked against vertical motion, the same will immediately operate the dial mechanism the instant the float is released when the car again reaches level ground.

The forward and backward movement of the driving shaft in response to the rising and falling of the float is transmitted by primary ratchet mechanisms to switch mechanisms which are arranged in electric circuits which include electro-motors for operating the secondary ratchet mechanisms which latter in turn operate dial mechanisms preferably arranged adjacent to the driver's compartment, in order to enable the driver to see at a glance the condition of his gasolene supply and the amount which has been consumed.

Those parts of the ratchet mechanisms and the electric switch mechanisms associated directly with the driving or float shaft 15 are for convenience regarded as a part of the float mechanism and are constructed as follows and shown in Figs. 1–8 and 23:—

33 represents a lower primary driving wheel and 34 an upper primary driving wheel both of which are secured to the driving shaft 15 so as to turn forwardly and backwardly therewith. These driving wheels are preferably constructed in the form of ratchet wheels, the teeth of the lower driving wheel 33 having their abrupt sides facing forwardly and their inclined sides facing rearwardly while the teeth of the upper driving ratchet wheel 34 have their abrupt sides facing rearwardly and their inclined sides facing forwardly. Between the lower and upper driving ratchet wheels the driving shaft is journaled in a cross bar 35 which is connected with the bar 18 and forms part of the same frame. Below the lower driving ratchet wheel is arranged a lower primary driven wheel 36 which is mounted loosely on the driving shaft so as to turn independently thereof. This lower driven wheel is also constructed preferably in the form of a ratchet wheel having teeth on its periphery which have their abrupt sides facing rearwardly and their inclined sides facing forwardly which teeth are engaged on diametrically opposite sides of this wheel by means of detent pawls or dogs 37 mounted on the cross bar 35 and operating to prevent backward rotation of the lower driven wheel but permitting forward rotation thereof. During the forward rotation of the lower driving wheel 33 this movement is transmitted to the lower driven wheel 36 by means of driving or operating pawls 38 arranged on diametrically opposite sides of the lower driven wheel and engaging with the teeth of the lower driving ratchet wheel on diametrically opposite sides of the latter, these pawls being constructed in the form of springs so that when the lower driving wheel moves forwardly the lower driven wheel is compelled to turn in the same direction therewith through the medium of the driving pawls 38 but when the lower driving wheel turns backwardly it moves independently of the lower driven wheel.

39 represents an upper primary driven wheel mounted loosely on the driving shaft above the upper driving wheel 34 and provided on its periphery with an annular row of ratchet teeth which are engaged on opposite sides of this wheel by means of detent pawls or dogs 40 mounted on the adjacent part of the cross bar 35, these teeth having their abrupt front sides facing forwardly and their inclined rear sides facing rearwardly so that the pawls 40 engaging therewith operate to permit the upper driven wheel 39 to only turn backwardly and not forwardly. Forward motion is transmitted from the upper driving wheel 34 to the upper driven wheel 39 by means of two spring driving or operating pawls 41, 41 mounted on the underside of this upper driven wheel and engaging with diametrically opposite sides of the teeth of the upper driving wheel 34, so that during the forward motion of the driving shaft 15 and the upper driving wheel the latter will turn forwardly independently of the upper driven wheel but during the backward rotation of the driving shaft and upper driving wheel the upper driving pawls 41 will compel the upper driven wheel 39 to also turn backwardly with the driving shaft. Each pair of operating and detent pawls which have been just described and which engage with the teeth on opposite sides of a ratchet wheel are so arranged that one pawl of each pair operates slightly in advance of the other which prevents undue slack or lost motion between any one of the ratchet wheels and its companion pawls without making the teeth unduly fine.

Associated with the lower primary ratchet mechanism is a primary switch device which during forward rotation of the lower driven wheel causes an electric circuit to be successively opened and closed at two different points adjacent to the float mechanism which primary switch device coöperates with elements associated with the dial mechanism for indicating the amount of gasolene which is supplied to the tank from time to time for a considerable period of time, for instance, during an entire year or motoring season. A similar primary switch device is associated with the upper primary ratchet mechanism and adapted to open and close an electric circuit successively at two different places adjacent to the float mechanism, this last mentioned switch device being associated with elements of the dial mechanism for the purpose of registering the amount of gasolene which is used on some particular trip or predetermined stretch of road which is to be traveled by the motor car. The switch device associated with the lower primary ratchet mechanism comprises two normally stationary contacts 42, 43 which are preferably constructed in the form of screws mounted on a stationary insulated support or standard 44 on the supporting plate 9, two movable contacts 45, 46 which are adapted to be engaged with and disengaged from the fixed contacts 42, 43, respectively, said movable contacts being preferably constructed in the form of spring metal strips and each strip secured at one end to the insulating support 44 while its free end is adapted to be moved toward and from the companion fixed contact, and two rotatable primary cam wheels 47, 48 constructed of insulating material and connected with each other and with the underside of the lower driven wheel 36, and adapted to shift said movable contacts into and out of engagement with their companion fixed contacts. Each of these cam wheels is mounted on the driving shaft 15 but turns independently thereof and is provided on its periphery with an annular row of equidistant cams, each of which is provided with a concentric outer face and an inclined front face and an abrupt rear face, so that when this cam wheel turns forwardly as indicated by the arrows 49 in Figs. 7, 8 and 23 the free end of the companion movable spring contact engaging therewith will be successively moved outwardly by the inclined front face of each of its cams and out of engagement from the companion fixed contact then held in this position by the concentric outer face of this cam and then permitted to drop off this cam along the rear abrupt face thereof and into engagement with the companion fixed contact due to the resilience of this movable contact, this operation being repeated by each of the cams of this cam wheel during the rotary movement of the latter. Each of these cam wheels is adapted to engage and disengage the contacts of the companion switch for making and breaking the respective circuit a number of times during each rotation of this wheel, the construction of the same, as shown in the drawings, being such that this wheel makes and breaks the respective circuit five times during each rotation of said cam. The two primary cam wheels 47, 48 are identical in construction but the same are preferably so arranged relatively to each other that their cams are staggered or set one half of a step apart so that while one of these cam wheels causes the contacts of its companion switch to be engaged and the circuit closed at that particular point, the other cam wheel will permit the contacts of the switch associated with the last mentioned cam wheel to be separated and open the electric circuit at the last mentioned switch, so that during the simultaneous rotation of these two primary cam wheels the electric circuit will be alternately opened and closed by the switches associated with these two wheels.

A similar primary electric switch is associated with the upper primary ratchet mechanism for coöperation with the trip registering device of the dial mechanism, said primary switch device, as shown in Figs. 3, 4, 5 and 23, comprising two fixed contacts 50, 51 having preferably the form of adjusting screws mounted on the insulating support 44, two movable contacts 52, 53 preferably constructed in the form of spring metal strips each of which is mounted at its fixed end on the insulating support 44 while its free end is movable into and out of engagement with the companion fixed contact, and two rotatable primary cam wheels 54, 55 constructed of insulating material and connected with each other and with the upper primary driven wheel 39 so as to turn together. These two cam wheels are mounted on the driving shaft but turn independently thereof and each of these wheels is provided on its periphery with a plurality of equidistant cams each of which is provided with an inclined rear face, a concentric outer face and an abrupt front face, so that upon turning these two cams backwardly, as shown by the arrow 56 in Figs. 3, 4 and 23, each one will separate one of the movable contacts from the companion fixed contact and then permit these contacts to again engage under the resilience of the spring action of the movable contact. As each cam wheel turns its inclined rear face pushes the free end of the respective movable contact outwardly out of engagement from the companion fixed contact, then the concentric face of this cam retains the movable contact in this position and when the abrupt front face of this cam is presented to the free end of the movable contact the latter, due to its spring action, will retract behind the abrupt face of the respective cam and permit this movable contact to engage with the companion fixed contact. The number of cams on the cam wheels 54, 55 may be varied but the same are preferably each provided with five cams, as shown in the drawings, and the cams of the two wheels are staggered so that they successively or alternately engage and disengage the respective electric switches with which they are associated and alternately open and close the electric circuits of which they form a part.

The dial mechanism which is preferably arranged adjacent to the driver's compartment, where the same is conveniently accessible for reading purposes, is constructed as follows:

57 represents an upright front plate or disk, 58 an upright rear plate or disk, 59 a horizontal longitudinal space bar connecting the lower parts of the front and rear plates and 60 an upper supporting plate connecting the upper parts of the front and rear plates, which parts together form the main members of the frame which support the working parts of the dial mechanism.

In rear of the upper left hand part of the front plate is arranged the means for registering the amount of gasolene or other liquid which is supplied to the tank 1. This indicating device may be of any suitable or well known construction but as shown in the drawings the same comprises a plurality of indicating or dial wheels 61, 62, 63, 64 which are arranged axially side by side and each provided on its periphery with an annular row of numbers running from naught to nine which are visible through an opening 65 in the front plate, the numerals of the first wheel 61 indicating units, the second wheel 62 tens, the third wheel 63 hundreds and the fourth wheel 64 thousands. These wheels may be operatively connected with each other in any suitable or usual manner for causing the tens wheel to be turned forward one space or one-tenth of a rotation at the end of each complete rotation of the units wheels and each succeeding higher wheel to be in like manner turned forward one step or member at the end of each rotation of the next lower dial wheel. Inasmuch as various well known means may be employed for thus carrying up from each lower dial wheel to the next higher dial wheel no detailed description or illustration of the same is here deemed necessary, it being sufficient for the present purpose to show the coöperation of the present improvement with the units wheel of this indciating device.

66 represents a horizontal arbor or supporting rod arranged transversely above the upper plate 60 and in rear of the upper part of the front plate and supported at its opposite ends in brackets 67, 67 projecting rearwardly from the front plate, as best shown in Figs. 14 and 19. On the left hand part of this arbor is rotatably mounted a tubular shaft or sleeve 68 the outer or left hand end of which is provided with a gear wheel 69 which meshes with a gear wheel 70 pivotally mounted at the left end of the set of season dial wheels but connected with the units dial wheel of this season indicator, in any suitable manner. To the left hand end of this tubular shaft 66 is also secured a ratchet wheel 71 the teeth on the periphery of which are adapted to be engaged successively by the nose or hook 72 of a pawl 73 which is arranged above this ratchet wheel, so that upon moving this pawl in one direction with an operative stroke its nose will engage the abrupt face of one tooth on the ratchet wheel 69 and turn the same one space and during the return movement of this pawl in the opposite direction its nose will be advanced preparatory to engaging the next following tooth of said ratchet wheel. This pawl is pivotally connected at its rear end with the upper arm of a rock lever 74 which latter is pivotally mounted for vertical oscillation on the rear side of the rear plate of the main frame of the dial mechanism. Between its front and rear ends the pawl 73 rests upon a shoulder, bracket or support 75 of the main frame against which the pawl is yieldingly held by means of a spring 76 connecting the pawl with the upper arm of the rock lever 73. On its underside the pawl is provided midway of its length with a cam face 77 which is so constructed that when the pawl is moved with an operative stroke by the rock lever this cam face will permit this pawl to descend and engage its tooth or nose with a tooth of the ratchet wheel 71 and turn the same one space and during the last portion of the idle return movement of this pawl its cam face by engagement with the shoulder 75 of the main frame will be again lifted so that its nose is raised above the path of the teeth of the ratchet wheel.

The rock lever 74 is turned backwardly together with the actuating pawl 73 by means of a spring 78 connecting the upper arm of this lever with the main frame and the forward movement of this lever is produced by an electro-motor comprising an electromagnet having its coil 79 mounted on the lower left hand part of the main frame while its pole is adapted to attract an armature 80 and a solenoid core 81 which are operatively connected with the lower arm of the lever 73. Upon energizing the coil 79 this armature and core are moved forwardly whereby the rock lever is turned in the direction for moving the actuating pawl into engagement with the teeth of the ratchet wheel 71 and turning the latter one space while upon deënergizing this coil the spring 78 operates to move these parts in the opposite direction.

The rotation of the tubular shaft 68 is utilized to operate a secondary switch device which causes electric circuit containing the coil 79 and an electric generator 82 and the switch contacts 42, 45, 43, 46 to be opened and closed alternately at intervals at a place adjacent to where the dial mechanism is located. This secondary electric switch mechanism comprises two fixed contacts 83, 84 which preferably are constructed in the form of screws mounted on the bracket 75 of the main frame but insulated therefrom, two movable contacts 85, 86 which are preferably constructed of spring metal strips and each secured at one end on said bracket but insulated therefrom while its opposite free end is adapted to be moved into and out of engagement with one of the normally fixed contacts 83, 84 and two secondary cam wheels 87, 88 of insulating material mounted on the hollow shaft 68 so as to turn therewith and adapted to operate the movable contacts 85, 86, respectively. Each of these cam wheels is provided on its periphery with a plurality of cams each of which has an inclined front face, a concentric outer face and an abrupt rear face so that upon turning this wheel each of its cams in turn will engage its inclined front face with the free end of the movable contact of the respective secondary switch and move the same outwardly into engagement with the companion fixed contact, the concentric face of this cam will hold the movable contact in engagement with said fixed contact and then the abrupt rear face of this cam during the continued forward movement thereof will permit the movable spring contact to drop from the high concentric face of this cam down to the inclined face of the next following cam and thereby break the connection between this movable contact and its companion fixed contact. The number of cams on each of these cam wheels may be varied but it is preferable to employ five cams on each of these wheels, as shown in the drawings. The cams of the two secondary wheels 87, 88 are staggered or so arranged that the cams of one wheel are one step or space ahead of the cams of the other wheels so that they open and close the secondary switches and the electric circuits with which they are associated alternately.

As shown in the diagram Fig. 23, the two movable contacts 45, 46 of the primary switches associated with the lower driven disk 36 are connected by a wire 89 with one side of the battery or electric generator 82, the fixed contacts 43, 42 of these switches are connected by wires 90, 91 with the fixed contacts 83, 84 of the secondary switches which are operated by the cams 87, 88 on the shaft 68, the opposite side of the battery is connected by a wire 92 with one end of the coil 79 and the other end of this coil is connected by a wire 93 with the movable contacts 85, 86 of the switches associated with the shaft 68.

From this it will be seen that the battery 82 and the electro-motor coil 79 are arranged in two adding electric circuits one of which contains the contacts 42, 45 of one primary float switch and the contacts 83, 85 of one secondary dial switch while the other contains the contacts 43, 46 of the other primary float switch and the contacts 84, 86 of the other secondary dial switch.

Assuming that the parts are in the position indicated in Fig. 23 in which the contacts 43, 46 of one float switch are engaged and the contacts 83, 85 of the companion dial switch are open, while the contacts 42, 42 of the other float switch are separated and the contacts 84, 86 of the companion dial switch are engaged, both of these circuits including the battery 82 and the coil 79 are broken, one at the float switch mechanism and the other at the dial switch mechanism, so that no current at this time flows through either of these circuits. If now the float rises in the tank due to an addition thereto of gasolene both the float cam wheels 47, 48 will be turned forwardly through the medium of the spiral 12, driving shaft 15 and associated parts, and the instant the turning movement of these cam wheels in this direction is sufficient to cause the movable contact 45 of the lower primary switch to drop off the respective cam and to become engaged with the companion fixed contact 42, and the movable contact 46 of the other float switch to be moved outwardly out of engagement from its companion fixed contact 43 by the high face of a cam on the companion cam wheel 48, then an electric circuit will be closed through the battery 82 and the electro-motor coil 79 at which time the current flows from one side of the battery through wire 92, coil 79, movable and fixed contacts 84, 86 of one of the dial switches, wire 91, fixed and movable contacts 42, 45 of one of the float switches, and wire 89 to the opposite side of the battery. The instant this occurs the coil 79 becomes energized and attracts the solenoid core and armature 80, 81, whereby the rock lever 74 is turned forwardly and the pawl 73 is caused to move with its nose 72 in engagement with the ratchet wheel 71 together with the shaft 68 carrying the cam wheels 87, 88 and the gear wheel 69. This turning movement of the shaft 68 causes the units dial wheel of the total or season register to be turned forwardly one number by reason of the gear wheel 70 of the units dial wheel meshing with the gear wheel 69 on the shaft 68, so that the registration of the amount of gasolene thus added to the tank is obtained on this total or season indicator. The turning of the shaft 68 also causes the two cam wheels 87, 88 to be rotated in the same direction so that the cam wheel 88 causes the contacts 84, 86 of the dial switch which has just been included in the live circuit to be opened for breaking this circuit, while the contacts 83, 85 of the other dial switch are engaged by the cam wheel 87 and the other circuit of the coil 79 and battery 82 are closed at this point, although this last mentioned circuit is still open by reason of the same having previously been broken by the separation of the contacts 43, 46 of the companion float switch due to the rising of the float. As the float continues to rise and turn the float cam wheels 47, 48 in the same direction the contacts 42, 45 will be again opened and the contacts 43, 46 closed so that an electric circuit of the battery 82 and the coil 79 is again closed at which time the current flows from one side of the battery through the wire 92, coil 79, wire 93, contacts 83, 85, wire 90, float contacts 43, 46 and wire 89 to the opposite side of the battery. The instant this occurs the energized coil 79 again attracts the solenoid 81 and armature 80, thereby causing the rock lever 74 to move the pawl 73 and again turn the ratchet wheel 71 forwardly one space, thereby causing the total or season register to add one more number thereto. At the same time the turning of the shaft 68 and the cam wheels 87, 88 with the ratchet wheel 71 causes the contacts 83, 85 of the dial switch which has just been active to be separated and the contacts 84, 86 of the other dial switch which has previously been inactive to be engaged, so that at this time both circuits of the battery 82 and the coil 79 are again broken, due to the opening of one of these circuits by the separation of the contacts of one float switch and the separation of the contacts of one dial switch in the other circuit.

It will be apparent from the foregoing explanation that the closing of one or the other of the two circuits or branches of the battery 82 and coil 79 is always effected preliminarily by one or the other of the float operated switches which are located adjacent to the gasolene tank but that the breaking of these circuits occurs successively by the dial switches adjacent to the driver's compartment due to the action of the coil 79. It is well known that sparks in an electric circuit of this character are only produced by the separation of two contacts of a switch in a live circuit and it follows from this that no spark is at any time produced between the contacts of either of the float operated switches because the contacts of each of these switches are always opened by the rising of the float during a time when the contacts of the companion dial switch are separated so that no spark can occur adjacent to the gasolene tank. By thus providing two electric circuits for operating the dial mechanism from the movement of the float, the current flowing in the live circuit first operates the magnet and then immediately shuts off the current, but leaves the parts in such condition that the other circuit will become alive when the float has risen sufficiently for this purpose. If the current were not shut off promptly after the dial mechanism was operated there would be needless waste of current and in case a battery was employed as a source of energy the same would soon run down, and in addition to this the contacts of the switches would be liable to heat unduly and possibly melt and also burn out the coil.

It is desirable to close the electric switch quickly and firmly adjacent to the gasolene tank instead of slowly and uncertainly, otherwise a spark is liable to be formed between the members of each pair of contacts 42—45, 43—46, 50—52 and 51—53 due to chattering or shivering of one of these movable contacts relative to its companion contact. This objection is avoided by causing the members of each of these pairs of contacts to become engaged by causing the movable contact to drop suddenly from the salient part of a cam to the companion fixed contact so that circuit is closed quickly and reliably as in a snap switch, otherwise objectionable sparking or arcing might be produced.

The breaking of the circuits at the dial mechanism should occur suddenly so as to avoid undue sparking or arcing between the contacts of the secondary switches. These conditions are fulfilled in the present organization inasmuch as the primary switches are so constructed that they close the circuits quickly and open the same slowly while these circuits have already been opened by the secondary switches, and the last mentioned switches open the circuits quickly and close the same slowly at a time when the respective circuits are opened by the primary switches. It is therefore impossible for any spark to be produced by the switches which are located adjacent to the gasolene tank and no explosion can occur which otherwise would endanger the safety of the passengers or the motor car. The dial or secondary electric switches are arranged so far from the gasolene tank that any sparks produced between the contacts thereof upon rotating the secondary cam wheels 87, 88, will be unable to ignite the gasolene vapors, so that this device can be used with perfect safety on gasolene operated automobiles or other installations.

Above the supporting plate 60 and in rear of the upper right hand part of the front plate 57 is arranged a registering device which is adapted to be operated by the descent of the float in the tank and register the amount of gasolene or other liquid which is withdrawn from the tank during a predetermined period, say during a certain trip or while running the motor car a certain distance or over a definite stretch of road. This trip indicator may also be constructed in any suitable or well known manner but as shown in the drawings the same comprises a plurality of dial wheels 94, 95, 96 which are arranged axially side by side and provided on their periphery with numerals running from naught to nine exposed through an opening 97 in the upper left hand part of the front plate 57, as shown in Figs. 12 and 17. The several dial wheels of the trip register are mounted upon a shaft 98 which is journaled horizontally and transversely in suitable bearings projecting rearwardly from the front plate. Upon the right hand part of this shaft is mounted an initial gear wheel 99 which is connected with the units wheel 94 of the trip register so as to turn therewith. During the last portion of each rotation of the units wheel 94 the tens dial wheel 95 is turned forwardly one-tenth of a rotation, in like manner the hundreds dial wheel 96 is turned forwardly one step during the last portion of each rotation of the tens dial wheel. The means whereby the numbers are thus carried from each lower dial wheel to the next higher wheel may be of any suitable character and as the same form no part of this invention further description relative thereto is deemed unnecessary.

100 represents a hollow shaft mounted on the right hand part of the arbor 66 and having secured thereto at its right hand end an operating ratchet wheel 101 which is provided on its periphery with ratchet teeth each of which has an abrupt front face and a rear inclined face. Above this ratchet wheel is arranged an operating pawl 102 which is provided at its front end with a nose 103 adapted to engage with one or another tooth of the ratchet wheel 101. The rear end of this pawl is pivoted to swing vertically on the upper arm of a vertically swinging rock lever 104 which is pivotally supported on the rear side of the rear frame plate 58 so that upon rocking this lever the actuating pawl 102 will be caused to move forwardly and backwardly relative to the trip dial mechanism. Between its ends the actuating pawl 102 is provided on its underside with a cam face 105 which rides upon a shoulder or bearing face formed on the upper edge of the adjacent bracket 75 and with which the same is yieldingly held in engagement by means of a spring 106 connecting the upper arm of the rock lever 104 with the actuating pawl 102, as shown in Figs. 17 and 18. During the advancing or operating movement of the pawl 102 its cam face 105 riding on the bracket 75 permits the same to descend and engage an adjacent tooth of the ratchet wheel 101 but during the last portion of the return or idle movement this pawl is elevated by engagement of its cam surface 105 with the bracket 75 so that the nose of this pawl is lifted above the path of the teeth of the ratchet wheel 101, as shown in Fig. 18. The rocking movement of the lever 104 and the reciprocating movement of its pawl 102 is so determined that during each operating stroke of this pawl the same moves the ratchet wheel 101 forward one tooth or space. The return movement of the rock lever and the actuating pawl connected therewith is effected by means of a spring 107 connecting the upper arm of this lever with the bracket 75. The operating movement of these parts is produced by an electro-motor, the electro-magnetic coil 108 of which is mounted horizontally on the lower right hand part of the main frame and adapted to attract a solenoid core 109 and an armature 110 which are operatively connected with the lower arm of the rock lever 104, as shown in Figs. 13, 14, 15, 17, 19 and 23.

To the inner side of the ratchet wheel 101 is secured an intermediate ratchet wheel 111 having the teeth on its periphery so constructed that each tooth has its abrupt side facing rearwardly and the inclined side thereof facing forwardly. Arranged between the actuating ratchet wheel 101 and intermediate ratchet wheel 111 is an intermediate gear wheel 112 which meshes with the initial gear wheel 99 of the trip indicating device, as shown in Fig. 19, and which is journaled on the hub of said intermediate ratchet wheel, as shown in Figs. 19 and 22. On the inner side of the intermediate gear wheel 112 the same is provided with a coupling pawl 114 which is pivoted thereto and yieldingly held with its nose in engagement with one or another of the teeth of the intermediate ratchet wheel 111 by means of a spring 115 arranged on the intermediate gear wheel and bearing against this coupling pawl, as shown in Fig. 17. By means of this connection between the intermediate gear wheel 112 and the register gear wheel 113 these two gear wheels are compelled to rotate together when the intermediate gear wheel 112 is turned by engagement of the actuating pawl 104 with the actuating ratchet wheel 101, but when it is desired to turn the several dial wheels of the trip register to zero, independently of its actuating device, it is possible to do this without disarranging other parts associated with the actuating mechanism which is operated by the descent of the float in the tank. This turning to zero of the several dial wheels of the trip register may be effected by means of a finger piece 116 operatively connected with the trip dial wheels in any suitable manner, and while turning this finger piece forwardly until all the trip dial wheels are in zero position the initial gear wheel 99 causes the intermediate gear wheel 112 to turn forwardly independently of the ratchet wheels 101 and 111, during which movement of the intermediate gear wheel 112 its pawl 114 trips idly over the teeth of this intermediate ratchet wheel. Backward rotation of the gear wheels 112, 113 is prevented by a detent pawl 200 mounted on the dial frame and engaging with the teeth of the gear wheel 112, as shown in Fig. 17.

This provision in the trip registering mechanism is desirable in order to permit of beginning the registration of the consumption of gasolene at the beginning of each trip, but a similar provision is ordinarily not required in the season register inasmuch as the latter need not be turned to zero at the end of a season because it is easy to make a notation of the condition of its dial at the end of one season and the beginning of another season.

Energizing and deënergizing of the coil 108 of the electro-motor which operates the trip register is effected during the descent of the float in the tank by utilizing the motion of the latter to periodically open and close electric circuits which include the coil 108 and the battery 82, also the contacts 50, 52, 51, 53, of the primary alternating switches mounted on the upper end of the float driving shaft 15 and also a secondary switch mechanism associated with the hollow shaft 100 of the trip registering mechanism. This secondary switch mechanism comprises two normally fixed contacts 117, 118 which preferably consist of adjustable screws mounted on the bracket 75 but insulated therefrom and two movable contacts 119, 120 which are preferably constructed of strips of spring metal and are mounted at one end on the bracket 75 but insulated therefrom while their opposite free ends are adapted to be engaged with and disengaged from the fixed contacts 117, 118, respectively. 121, 122 represent two rotatable cam wheels which are constructed of insulating material and mounted side by side on the tubular shaft 100 so as to turn with the same and the intermediate gear wheel 112 and ratchet wheels 101, 111, as shown in Fig. 19. Each of these cam wheels is provided on its periphery with an annular row of cams adapted to engage with the free end of one of the movable contacts 119 or 120 for the purpose of intermittently moving the respective contact into engagement with its companion fixed contact 117 or 118. Each of the cams of one of these cam wheels is provided with an inclined front side, a concentric outer side and an abrupt rear side so that each cam in turn engages the free end of its companion movable contact and moves the same into engagement with the companion fixed contact and then allow this movable contact to move inwardly past the abrupt side of this cam due to the resilence of this contact and thereby disengage the latter from its companion fixed contact. The cam wheels 121, 122 are so arranged relatively to each other that their cams are staggered or in other words the high faces of the cams of one wheel are arranged opposite the low faces of the cams of the other wheel.

The movable contacts 52, 53 of the primary trip switches are connected by a wire 123 with one side of the battery 82 while the companion fixed contacts 51, 50 of these switches are connected by wires 124, 125 with the two fixed contacts 117, 118 of the secondary switches of the trip registering mechanism. The opposite side of the battery 82 is connected by a wire 126 with one end of the coil 108 and the opposite end of this coil is connected by a wire 127 with the movable contacts 119, 120 of the secondary trip registering switches. It will be noted that by this means two electric circuits or branch circuits are formed each of which includes a primary switch at the gasolene tank and a secondary switch at the driver's station or other place remote from the gasolene tank, and during the operation of these switches these two circuits are opened and closed alternately so that the battery 82 and the coil 108 are alternately included in these circuits and the coil is sucessively energized and deënergized. As shown in Fig. 23 the contacts 50, 52 of the lower primary switch of the trip indicator are engaged, the contacts 51, 53 of the upper primary switch of this mechanism are separated, the contacts 117, 119 of one of the secondary switches are engaged and the contacts 118, 120 of the other companion secondary switch are disengaged. When the parts are in this position the circuits through both pairs of these primary and secondary switches are broken and the coil 108 is deënergized. When the float descends a predetermined distance due to the removal therefrom of a certain quantity of gasolene or other liquid both primary cam wheels 54, 55 are turned backwardly in the direction of the arrows 56, in Fig. 23, which causes the cam wheel 54 to shift the movable contact 52 out of engagement from the fixed contact 50 and the cam wheel 55 to permit the movable contact 53 to engage with the fixed contact 51. When this occurs the current passes from one side of the battery 82 successively through the wire 126, coil 108, wire 127, movable contact 119, fixed contact 117, wire 124, fixed and movable contacts 51 and 53 and wire 123 to the opposite side of the battery. No current can, however, pass through the other companion circuit by reason of the same being broken by the separation of the primary contacts 50, 52 and the separation of the secondary contacts 118, 120. Owing to the closing of the circuit which includes the primary contacts 51, 50 and the secondary contacts 117, 119, the coil 108 becomes energized and immediately causes the two secondary cam wheels 121, 122 to be rotated in the direction of the arrow 128 through the medium of the ratchet mechanism associated with these parts whereby the circuit of the battery 82 and coil 108 is broken by reason of the movable contact 119 dropping off the high part of the respective cam and disengaging from the companion fixed contact 117, but the contacts 118, 120 of the other secondary trip switch are engaged with each other by reason of the high part of one of the cams of the companion cam wheel 122 moving the movable contact 120 into engagement with the companion fixed contact 118. One of the circuits is now again opened by reason of the separation of the secondary contacts 117, 119 of one of the secondary switches while the other circuit is opened by reason of the separation of the primary contacts 52, 50 in the other circuit. While the secondary cam wheels 121, 122 are thus turned the actuating pawl 102 during its operative stroke upon energizing the coil 108 also causes the main ratchet wheel 101 to be turned forwardly one space or step which movement is in turn transmitted to the intermediate gear wheel 112, the initial indicator gear wheel 113 and to the trip indicator so that the latter records that one gallon of gasolene or other liquid has been substracted from the tank.

When the float descends another step in the tank due to further removal of gasolene therefrom the primary cam wheels 54, 55 are turned backwardly another step causing one of the cams of the lower primary cam wheel 54 to move the respective movable contact 52 into engagement with the companion fixed contact 50, thereby closing the circuit of which the wire 125, the battery 82 and the coil 108 form parts, at which time the current flows from one side of the battery successively through the wire 126, coil 108, wire 127, movable contact 120, fixed contact 118, wire 125, fixed contact 50, movable contact 52 and wire 123 to the opposite side of the battery. The coil 108 is now again energized and causes the trip indicator to be advanced another number or step and the two secondary cam wheels 121, 122 to be turned forwardly so that the secondary cam wheel 122 breaks the circuit between the secondary contacts 118, 120 which includes the coil and battery and the other secondary cam wheel 121 engages the secondary contacts 117, 119, the circuit of which the last mentioned contacts form a part being, however, still open by reason of the separation at this time of the primary contacts 51, 53.

It will thus be apparent that these two circuits are alternately opened and closed and that the initial closing of each circuit is effected by the respective primary switch at the gasolene tank but is subsequently opened by the contacts of the companion secondary switch at a place remote from the gasolene tank. Whenever the contacts of a primary switch are separated the circuit in which they are included has been previously broken by the separation of the contacts of the companion secondary switch at a place remote from the gasolene tank. The production of any sparks due to the separation of contacts in a live circuit adjacent to the gasolene tank is by this means avoided, thereby preventing the ignition of any gasolene vapors which may be present adjacent to the tank so that the danger of explosions is positively prevented.

The mechanism herein before described for indicating or registering the amount of gasolene which is supplied during a season or a prolonged period and the amount of gasolene which is consumed during a particular trip or stretch of road is preferably combined with an indicating, registering or recording device which automatically indicates the amount of gasolene or other liquid which is contained at any particular time in the supply tank. The means whereby the quantity of the liquid in the tank or the level of the same may be determined is preferably constructed as follows:

Between the underside of the top plate 60 and the electro-motor coils 19, 108 is arranged a tank level indicator or dial wheel which preferably comprises a hub 113 journaled on a hollow arbor 129 depending from the underside of the top plate 60, a web or disk 130 connected with the lower end of this hub, and an annular flange or rim 131 arranged at the outer edge of the disk and provided on its periphery with graduations and corresponding numerals, these graduations and numerals being preferably spaced to represent 34 gallons during a complete rotation of this dial wheel although other divisions of the same may be provided, if desired. The numerals of this dial wheel which correspond to the level of the liquid in the tank are visible through an opening 132 in the front plate 57 immediately below the openings through which the registration of the season and trip dial wheels may be read. By making the arbor 129 hollow the same is not only light but this serves as a convenient passage through which the conducting wires of the above described electric circuits may be passed for convenience and compactness of insulation.

When a quantity of gasolene is supplied to the tank and the float rises this movement of the float is caused to turn the tank level dial wheel so as to increase the reading on its face while upon removing gasolene from the tank the tank dial wheel will be turned in the opposite direction and the reading upon its face will be decreased accordingly. In order to secure this forward and backward rotation of the tank level dial wheel means are provided whereby the same is always turned forwardly whenever additions are made to the season or total register, and this tank dial wheel is always turned backwardly whenever the trip register is operated for indicating substraction from the gasolene supply, this forward and backward movement of the tank dial wheel corresponding in measure to the addition represented by the season register and the subtraction of the trip register. The forward movement of the tank dial wheel is effected by means which comprise an adding gear wheel 133 mounted loosely on the left hand end of the arbor 66, as shown in Figs. 19 and 21 and meshing with a gear rim 134 formed on the upper edge of the dial flange 131, and a ratchet wheel 135 secured to or formed on the inner side of this gear wheel 133 so as to turn therewith. The ratchet wheel 135 is arranged close to the outer side of the ratchet wheel 71, these two ratchet wheels being identical in construction so far as their diameter, form and number of their teeth are concerned and the corresponding teeth of both these wheels being arranged in line and facing with their abrupt sides in one direction and their inclined sides in the opposite direction.

The nose 72 of the adding pawl 73 is so arranged that the same straddles both ratchet wheels 71, 135 and during the operative stroke of this pawl its nose engages the corresponding teeth of both of these ratchet wheels and turns the same simultaneously, thereby causing a forward or additional movement of the season register and a forward or additional movement on the tank register which correspond in amount to the volume of liquid which has been added to the tank. At the end of the return stroke of this actuating pawl the nose 72 thereof is lifted clear not only of the teeth of the season ratchet wheel 71 but also of the tank ratchet wheel 135, thereby leaving the tank dial wheel free to be turned backwardly independently of the actuating pawl 73 and associated parts, when this is necessary.

136 represents a substracting gear wheel mounted loosely on the right hand end of the arbor 66 and meshing with the teeth of the gear rim 134 on the right hand side of the axis of the tank dial wheel, as shown in Figs. 18, 19 and 22. On its inner side the gear wheel 136 has secured thereto a ratchet wheel 137 which turns therewith and is arranged adjacent to the ratchet wheel 101 mounted on the right hand end of the tubular shaft 100. These two last mentioned ratchet wheels also correspond in diameter and in the number of their teeth, and the teeth of both of these ratchet wheels are so arranged that corresponding teeth are arranged transversely in line and all of their teeth have their abrupt sides facing in one direction and their inclined sides facing in the opposite direction.

The subtracting pawl 102 is arranged with its nose 103 so that the latter straddles the teeth of both ratchet wheels 101, 137 whereby said nose during an operative stroke of this pawl will engage a corresponding pair of teeth of these ratchet wheels and move both of them forward one step or space, thereby producing a subtracting movement simultaneously on the trip register and the tank register, by reason of the fact that the gear wheel 136 operates to turn the tank dial wheel backwardly. At the end of the subsequent return movement of the subtracting pawl 102 its nose is again lifted out of the path of the teeth of both ratchet wheels 101, 137 so that the tank level dial wheel is free to be turned independently of the subtracting pawl by the adding pawl and associated parts.

It will thus be noted that the tank level dial wheel when at rest is operatively disconnected from both the adding pawl and the subtracting pawl but is capable of being turned forwardly on one side of its axis by the adding mechanism independently of the subtracting mechanism, or backwardly on the opposite side of its axis by the subtracting mechanism independently of the adding mechanism. From the foregoing it will now be clear that whenever the float rises in the tank due to the addition thereto of gasolene or other liquid the season register will be operated to add thereto an amount equal to the amount of gasolene which has been added to the tank and at the same time the tank level dial will be advanced so as to indicate the quantity of gasolene or liquid which is on hand in the tank, but when the float descends in response to the consumption of gasolene which is removed therefrom the trip register will be operated to indicate a corresponding subtraction of the gasolene from the tank while the tank level dial will be turned backwardly so as to indicate a corresponding decrease in the volume of gasolene on hand.

In the absence of any provision to prevent it the quick operation of the electro-motors on the various registering devices is liable at times to overthrow the same and thus produce an inaccurate showing of the same. To avoid this retarding devices are applied to the tubular shafts 68, 100 of the season and trip registering devices and also to the disk of the tank registering device. The retarding device for the season and trip registers preferably comprise two brake bands 138 of spring metal which embrace the inner ends of these tubular shafts and each of which rests at one end on an adjacent abutment 139 forming part of the frame of the apparatus while the other end is connected with this abutment by means of an adjusting screw 140, as shown in Figs. 14, 15 and 19. By tightening the screws 140 more or less a sufficient frictional grip may be produced by the brake bands 138 on these tubular shafts so that they will be able to turn under the influence of the operating mechanism associated therewith but the same will be prevented from being overthrown, thereby insuring a proper showing of the season and trip registers in response to the rising and falling of the float in the tank.

The means whereby this same effect is produced on the tank level register comprises an annular row of conical openings or recesses 141 formed on the upper side of the disk of the tank level dial wheel, a detent pawl 142 adapted to engage with one or the other of these recesses from the upper side thereof, a bracket 143 depending from the underside of the top plate 60 and provided at its lower end with a guide pocket 144 which receives this ball, and a spring 145 arranged in this pocket and bearing at its upper end against the bottom of the same and at its opposite end against the top of the ball for holding the latter yieldingly in engagement with one or the other of the retaining recesses 141 of the tank dial wheel. The pressure which the spring exerts against the detent pawl when the latter engages one of the recesses 141 is sufficient to prevent accidental displacement of the tank level dial wheel but yields freely when this wheel is turned either forwardly or backwardly by the adding or subtracting actuating mechanism. A sufficient number of recesses 141 are provided to hold the same in position after each operation of one or the other of the actuating devices associated therewith.

It is to be understood that in the manufacture of this apparatus the movement of the float and the extent of the rotation of the spiral produced by the rising and falling of the float is calibrated to represent a certain volume of liquid in any particular height of the float within the tank according to the shape of the latter and that the season trip and tank registers are constructed to correspond to the volume of liquid which is represented by the rising and falling of the float within the tank. A gallon has been adopted as a convenient standard of measurement for this purpose and each numeral on the season, trip and tank registers is therefore equivalent to gallons. The tank wheel has been constructed to register a maximum of 34 gallons during a complete rotation of the same but it is to be understood that this can be varied if desired.

This improved apparatus for registering liquid is positive in its action and furnishes a reliable and accurate statement of the total amount of gasolene used during a season as well as on some particular trip and also the amount of gasolene or liquid remaining in the tank, so that an accurate computation can be made, such as the cost of fuel for operating a motor car for any period of time, and the operator can also readily determine at any time whether or not his gasolene supply is running low and needs replenishing.

Furthermore, this apparatus can be readily installed in connection with motor car equipments as now generally constructed without any material alteration in the same and without undue expense, and by reason of the fact that it is impossible to produce a spark adjacent to the gasolene tank absolute security against ignition of gasolene vapors is assured, thereby rendering the use of this recording device perfectly safe and without endangering the security of the car or its passengers.

We claim as our invention:

1. An indicating mechanism for liquid tanks comprising a float adapted to rise and fall with the change in the level of the liquid in a tank, two ratchet mechanisms one of which is moved effectively by the rise of said float and the other being moved effectively by the fall of the same and two registers one of which is operated by one of said ratchet mechanisms and adds when the float rises while the other is operated by the other ratchet mechanism and subtracts when the float descends.

2. An indicating mechanism for liquid tanks comprising a float adapted to rise and fall with the change in the level of the liquid in a tank, two ratchet mechanisms one of which is moved effectively by the rise of said float and the other being moved effectively by the fall of the same, two electric switches one of which is opened and closed by one of said ratchet mechanisms and the other being opened and closed by the other ratchet mechanism and two registers one of which is operated by one of said ratchet mechanisms and adds when the float rises while the other is operated by the other ratchet mechanism and subtracts when the float descends.

3. An indicating mechanism for liquid tanks comprising a float adapted to rise and fall with the change in the level of the liquid in a tank, a spiral which is oscillated by said float during its rising and falling movement, a driving shaft connected with said spiral, two driving ratchet wheels secured to said shaft and one having the abrupt sides of its teeth facing forwardly and the other having the abrupt sides of its teeth facing backwardly, two driven ratchet wheels mounted loosely on said shaft and one having the abrupt sides of its teeth facing forwardly and the other having the abrupt sides of its teeth facing backwardly, operating pawls arranged on each driven ratchet wheel and engaging with the teeth of one of the driving ratchet wheels, detent pawls arranged on a relatively stationary part and engaging with the teeth of said driven ratchet wheels and two registers one of which is operated by one of said ratchet mechanisms and adds when the float rises while the other is operated by the other ratchet mechanism and subtracts when the float descends.

4. An indicating mechanism for liquid tanks comprising a float adapted to rise and fall with the change in the level of the liquid in a tank, a spiral which is oscillated by said float during its rising and falling movement, a driving shaft connected with said spiral, two driving ratchet wheels secured to said shaft and one having the abrupt sides of its teeth facing forwardly and the other having the abrupt sides of its teeth facing backwardly, two driven ratchet wheels mounted loosely on said shaft and one having the abrupt sides of its teeth facing forwardly and the other having the abrupt sides of its teeth facing backwardly, operating pawls arranged on each driven ratchet wheel and engaging with the teeth of one of the driving ratchet wheels, detent pawls arranged on a relatively stationary part and engaging with the teeth of said driven ratchet wheels, two rotatable cam wheels each turning with one of said driven ratchet wheels, two electric switches each having a normally fixed contact and a movable contact adapted to engage the companion fixed contact and actuated by one of said cam wheels and two registers one of which is operated by one of said ratchet mechanisms and adds when the float rises while the other is operated by the other ratchet mechanism and subtracts when the float descends.

5. An indicating mechanism for liquid tanks comprising a float adapted to rise and fall with liquid in a tank, two cam wheels operatively connected with said float so as to be turned by the vertical motion of said float each of said wheels having a plurality of cams and the cams of both wheels being staggered relatively to each other, and two electric switches each of which has a fixed contact and a movable contact which is movable toward and from its companion fixed contact and which is actuated by the cams of one of said wheels.

6. An indicating mechanism for liquid tanks comprising a float adapted to rise and fall with the change in the level of the liquid in a tank, a spiral which is oscillated by said float during its rising and falling movement, a driving shaft connected with said spiral, two driving ratchet wheels secured to said shaft and one having the abrupt sides of its teeth facing forwardly and the other having the abrupt sides of its teeth facing backwardly, two driven ratchet wheels mounted loosely on said shaft and one having the abrupt sides of its teeth facing forwardly and the other having the abrupt sides of its teeth facing backwardly, operating pawls arranged on each driven ratchet wheel and engaging with the teeth of one of the driving ratchet wheels, detent pawls arranged on a relatively stationary part and engaging with the teeth of said driven ratchet wheels, two pairs of rotatable cam wheels each pair turning with one of said driven ratchet wheels, two pairs of electric switches each of which comprises a fixed contact and a movable contact adapted to engage said fixed contact and actuated by one of said cam wheels and two registers one of which is operated by one of said ratchet mechanisms and adds when the float rises while the other is operated by the other ratchet mechanism and subtracts when the float descends.

7. An indicating mechanism for liquid tanks comprising a float adapted to rise and fall with the change of a liquid level in a tank, a registering device, and means for operating said registering device responsive to the rise and fall of said float comprising an electro-motor operatively connected with said registering device and having a coil, an electric circuit including said coil and a source of electricity and having two branches, two primary switches actuated by the movement of said float and arranged respectively in the branches of said electric circuit, and two secondary switches arranged respectively in the branches of said electric circuit and operated by said electro-motor, said switches being so organized that the initial opening of the electric circuit is effected only by one or another of said secondary switches and the initial closing of this circuit is effected only by one or another of said primary switches.

8. An indicating mechanism for liquid tanks comprising a float adapted to rise and fall with the change of a liquid level in a tank, a registering device, and means for operating said registering device responsive to the rise and fall of said float comprising an electro-motor operatively connected with said registering device and having a coil, an electric circuit including said coil and a source of electricity and having two branches, two primary switches actuated by the movement of said float and arranged respectively in the branches of said electric circuit, and two secondary switches arranged respectively in the branches of said electric circuit and operated by said electro-motor, said switches being constructed to open and close the branches of said electric circuit alternately, said switches being so organized that the initial opening of the electric circuit is effected only by one or another of said secondary switches and the initial closing of this circuit is effected only by one or another of said primary switches.

9. An indicating mechanism for liquid tanks comprising a float adapted to rise and 1,281,313 fall with the change of a liquid level in a tank, a registering device, and means for operating said registering device responsive to the rise and fall of said float comprising an electro-motor operatively connected with said registering device and having a coil, an electric circuit including said coil and a source of electricity and having two branches, two primary switches actuated by the movement of said float and arranged respectively in the branches of said electric circuit, and two secondary switches arranged respectively in the branches of said electric circuit and operated by said electro-motor, said switches being constructed to open and close the branches of said electric circuit alternately and said secondary switches being so constructed and operated that when the electric circuit including said coil is closed through one of said branches the secondary switches will be operated so that the secondary switch in the live circuit will be opened and the secondary switch in the other or dead circuit will be closed, said switches being so organized that the initial opening of the electric circuit is effected only by one or another of said secondary switches and the initial closing of this circuit is effected only by one or another of said primary switches.

10. An indicating mechanism for liquid tanks comprising a float adapted to rise and fall with the change of a liquid level in a tank, a registering device, and means for operating said registering device responsive to the rise and fall of said float comprising an electro-motor operatively connected with said registering device and having a coil, an electric circuit including said coil and a source of electricity and having two branches, two primary switches actuated by the movement of said float and arranged respectively in the branches of said electric circuit, and two secondary switches arranged respectively in the branches of said electric circuit and operated by said electro-motor, said switches being constructed to open and close the branches of said electric circuit alternately and said secondary switches being so constructed and operated that when the electric circuit including said coil is closed through one of said branches the secondary switches will be operated so that the secondary switch in the live circuit will be opened and the secondary switch in the other or dead circuit will be closed and said primary switches being so constructed and operated that when the electric circuit including said coil is closed through one of said branches and the respective primary switch, the other primary switch and the respective branch circuit will be open, said switches being so organized that the initial opening of the electric circuit is effected only by one or another of said secondary switches and the initial closing of this circuit is effected only by one or another of said primary switches.

11. An indicating mechanism for liquid tanks comprising a float adapted to rise and fall with the change of a liquid level in a tank, a registering device, and means for operating said registering device responsive to the rise and fall of said float comprising an electro-motor operatively connected with said registering device and having a coil, an electric circuit including said coil and a source of electricity and having two branches, two primary switches actuated by the movement of said float and arranged respectively in the branches of said electric circuit, and two secondary switches arranged respectively in the branches of said electric circuit and operated by said electro-motor, said switches being constructed to open and close the branches of said electric circuit alternately and said secondary switches being so constructed and operated that when the electric circuit including said coil is closed through one of said branches the secondary switches will be operated so that the secondary switch in the live circuit will be opened and the secondary switch in the other or dead circuit will be closed, the relative timing of these parts being such that when the float is at rest one of the primary switches in one branch circuit will be open and the secondary switch in the corresponding branch will be closed, and the primary switch in the other branch circuit will be closed and the secondary switch in the corresponding branch circuit will be open, but when the float moves vertically a predetermined distance the primary switch which has previously been open will now be closed and thereby render the respective branch circuit active while the other primary switch which has previously been closed will now be opened, and said electro-motor being adapted upon the closing of a branch circuit by such movement of the float to open the secondary switch in the branch circuit which has just been active and to close the secondary switch in the branch circuit which has just been closed by the companion primary switch, said switches being so organized that the initial opening of the electric circuit is effected only by one or another of said secondary switches and the initial closing of this circuit is effected only by one or another of said primary switches.

12. An indicating mechanism for liquid tanks comprising an adding device adapted to record the total amount of liquid placed in the tank, a subtracting device adapted to record the amount of liquid removed from the tank, and a liquid level indicator adapted to move forwardly with said adding device and backwardly with said subtracting device, and to be free from both of said devices when the same are turned to zero.

13. An indicating mechanism for liquid tanks comprising a float adapted to rise and fall with the changing level of liquid in a tank, an adding register adapted to indicate the amount of liquid supplied to said tank, a subtracting register adapted to indicate the amount of liquid removed from the tank, and means for causing the rise and fall of the float to be transmitted to the adding and subtracting registers, respectively, comprising a shaft which is turned forwardly and backwardly in response to the vertical movement of said float, an adding electro-motor for operating the adding register, a subtracting electro-motor for operating the subtracting register, an adding switch arranged in the circuit of said adding motor, a subtracting switch arranged in the circuit of said subtracting motor, an adding cam which is actuated by the forward movement of said shaft and which operates said adding switch, and a subtracting cam which is actuated by the backward movement of said shaft and which operates said subtracting switch.

14. An indicating mechanism for liquid tanks comprising a float adapted to rise and fall with the changing level of liquid in a tank, an adding register adapted to indicate the amount of liquid supplied to said tank, a subtracting register adapted to indicate the amount of liquid removed from the tank, means for causing the rise and fall of the float to be transmitted to the adding and subtracting registers, respectively, a tank register adapted to indicate the amount of liquid contained in the tank, and means for causing said tank register to be turned forwardly with said adding register and backwardly with said subtracting register.

15. An indicating mechanism for liquid tanks comprising a float adapted to rise and fall with the changing level of liquid in a tank, an adding register adapted to indicate the amount of liquid supplied to said tank, a subtracting register adapted to indicate the amount of liquid removed from the tank, means for causing the rise and fall of the float to be transmitted to the adding and subtracting registers, respectively, a tank register adapted to indicate the amount of liquid contained in the tank and comprising a rotatable dial wheel having an annular gear rim, and means for causing said tank dial wheel to be turned forwardly with said adding register and backwardly with said subtracting register comprising driving gear wheels meshing with said gear rim on opposite sides of the axis of said tank dial wheel and operatively associated with the actuating mechanism of said adding and subtracting registers.

16. An indicating mechanism for liquid tanks comprising a float adapted to rise and fall with the changing level of liquid in a tank, an adding register adapted to indicate the amount of liquid supplied to said tank and having an initial driven gear wheel, subtracting register adapted to indicate the amount of liquid removed from the tank and having an initial driven gear wheel, means for causing the rise and fall of the float to be transmitted to the adding and subtracting register, respectively, comprising two main driving gear wheels meshing respectively with the driven gear wheels of said adding and subtracting register and each provided with a main ratchet wheel, actuating pawls adapted to engage said ratchet wheels, a tank register adapted to indicate the amount of liquid contained in the tank and comprising a rotatable dial wheel having an annular gear rim, and means for causing said tank dial wheel to be turned forwardly with said adding register and backwardly with said subtracting register comprising two intermediate gear wheels meshing with said gear rim on opposite sides of the axis of said dial wheel and each provided with a ratchet wheel in position to be engaged by one of said pawls.

17. An indicating mechanism for liquid tanks comprising a float adapted to rise and fall with the changing level of liquid in a tank, an adding register adapted to indicate the amount of liquid supplied to said tank and having an initial driven gear wheel, subtracting register adapted to indicate the amount of liquid removed from the tank and having an initial driven gear wheel, means for causing the rise and fall of the float to be transmitted to the adding and subtracting register, respectively, comprising two main driving gear wheels meshing respectively with the driven gear wheels of said adding and subtracting register and each provided with a main ratchet wheel, actuating pawls adapted to engage said ratchet wheels, a tank register adapted to indicate the amount of liquid contained in the tank and comprising a rotatable dial wheel having an annular gear rim, and means for causing said tank dial wheel to be turned forwardly with said adding register and backwardly with said subtracting register comprising two intermediate gear wheels meshing with said gear rim on opposite sides of the axis of said dial wheel and each provided with a ratchet wheel in position to be engaged by one of said pawls, and means for causing said pawls to be disengaged from said ratchet wheels at the end of their idle return strokes.

18. An indicating mechanism for liquid tanks comprising a float adapted to rise and fall with the changing level of liquid in a tank, an adding register adapted to indicate the amount of liquid supplied to said tank and having an initial driven gear wheel, subtracting register adapted to indicate the amount of liquid removed from the tank and having an initial driven gear wheel, means for causing the rise and fall of the float to be transmitted to the adding and subtracting register, respectively, comprising two main driving gear wheels meshing respectively with the driven gear wheels of said adding and subtracting register and each provided with a main ratchet wheel, actuating pawls adapted to engage said ratchet wheels, a tank register adapted to indicate the amount of liquid contained in the tank and comprising a rotatable dial wheel having an annular gear rim, and means for causing said tank dial wheel to be turned forwardly with said adding register and backwardly with said subtracting register comprising two intermediate gear wheels meshing with said gear rim on opposite sides of the axis of said dial wheel and each provided with a ratchet wheel in position to be engaged by one of said pawls, and means for causing said pawls to be disengaged from said ratchet wheels at the end of their idle return strokes comprising cams arranged on said pawls and adapted to engage fixed supporting surfaces.

19. An indicating mechanism for liquid tanks comprising a float adapted to rise and fall with the level of the liquid in a tank, a register, and means for transmitting motion from said float to said register constructed to permit said register to be operated independently of the position of said float.

20. An indicating mechanism for liquid tanks comprising a register having an initial driven gear wheel, and means for transmitting motion to said register comprising a driving gear wheel meshing with said driven gear wheel, two ratchet wheels which turn together, an actuating pawl adapted to engage one of said ratchet wheels and a coupling pawl arranged on said driving gear wheel and engaging with the other ratchet wheel.

21. An indicating mechanism for liquid tanks comprising shifting means responsive to variations in the level of the liquid, an indicator, an electro-motor for operating said indicator, two primary switches which are operated by said shifting means, two secondary switches, and a source of electric energy, one primary and secondary switch and said motor and source of energy being arranged in one circuit, the other primary and secondary switches and said motor and source of energy being arranged in another circuit, said primary switches being constructed to close quickly and said secondary switches being constructed to open quickly.

22. An indicating mechanism for liquid tanks comprising shifting means responsive to variations in the level of the liquid, an indicator, an electro-motor for operating said indicator, two primary switches which are operated by said shifting means, two secondary switches, and a source of electric energy, one primary and secondary switch and said motor and source of energy being arranged in one circuit, the other primary and secondary switches and said motor and source of energy being arranged in another circuit, said primary switches being constructed to close quickly and open slowly and said secondary switches being constructed to open quickly and close slowly.

CLEBURNE EBERHART, Jr.
SAMUEL MAZUR.